United States Patent
McClure

(10) Patent No.: US 11,429,450 B2
(45) Date of Patent: Aug. 30, 2022

(54) AGGREGATED VIRTUALIZED COMPUTE ACCELERATORS FOR ASSIGNMENT OF COMPUTE KERNELS

(71) Applicant: VMware, Inc., Palo Alto, CA (US)

(72) Inventor: Matthew D. McClure, Alameda, CA (US)

(73) Assignee: VMWARE, INC., Palo Alto, CA (US)

( * ) Notice: Subject to any disclaimer, the term of this patent is extended or adjusted under 35 U.S.C. 154(b) by 193 days.

(21) Appl. No.: 16/394,063

(22) Filed: Apr. 25, 2019

(65) Prior Publication Data
US 2020/0341812 A1 Oct. 29, 2020

(51) Int. Cl.
*G06F 9/50* (2006.01)
*G06F 8/75* (2018.01)

(52) U.S. Cl.
CPC ............... *G06F 9/505* (2013.01); *G06F 8/75* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 9,015,724 B2* | 4/2015 | Druyan | ............... | G06F 9/505 718/104 |
| 9,244,652 B1* | 1/2016 | Ellis | ............... | G06F 9/5038 |
| 10,104,187 B2* | 10/2018 | Shi | ............... | H04L 67/16 |
| 10,713,404 B1* | 7/2020 | Schumacher | ............... | G06F 8/54 |
| 2010/0223591 A1* | 9/2010 | Shi | ............... | G06F 9/5038 717/102 |
| 2013/0232495 A1* | 9/2013 | Rossbach | ............... | G06F 9/5044 718/102 |
| 2014/0059114 A1* | 2/2014 | Kim | ............... | H04L 67/42 709/203 |
| 2018/0081804 A1* | 3/2018 | Turner | ............... | G06F 12/084 |
| 2018/0219797 A1* | 8/2018 | Sen | ............... | H04L 67/34 |
| 2020/0174840 A1* | 6/2020 | Zhao | ............... | G06N 3/084 |

* cited by examiner

*Primary Examiner* — Meng Ai T An
*Assistant Examiner* — Zujia Xu
(74) *Attorney, Agent, or Firm* — Thomas Horstemeyer, LLP

(57) ABSTRACT

Disclosed are various embodiments for assigning compute kernels to compute accelerators that form an aggregated virtualized compute accelerator. A directed, acyclic graph (DAG) representing a workload assigned to a virtualized compute accelerator is generated. The workload can include a plurality of compute kernels and the DAG comprising a plurality of nodes and a plurality of edges, each of the nodes representing a respective compute kernel, each edge representing a dependency between a respective pair of the compute kernels, and the virtualized compute accelerator representing a logical interface for a plurality of compute accelerators. The DAG can be analyzed to identify sets of dependent compute kernels, each set of dependent compute kernels being independent of the other sets of dependent compute kernels and execution of at least one compute kernel in a set of dependent compute kernels depending on a previous execution of another computer kernel in the set of dependent compute kernels. Then, each set of dependent compute kernels can be assigned to a respective one of the plurality of compute accelerators.

20 Claims, 6 Drawing Sheets

AGGREGATED VIRTUALIZED COMPUTE ACCELERATORS FOR ASSIGNMENT OF COMPUTE KERNELS

BACKGROUND

Various types of computational tasks are often more efficiently performed on specialized computer hardware than on general purpose computing hardware. For example, highly parallelizable algorithms or operations on large datasets are often performed more quickly and efficiently if off-loaded to a graphics processing unit (GPU) than if they are implemented on a general purpose central processing unit (CPU). Likewise, application specific integrated circuits (ASICS) are often able implement an algorithm more quickly than a CPU, although the ASICS may be unable to perform any computation other than the algorithm which they are designed to implement.

In the cloud computing context, data processing is often performed by servers operating in a datacenter. These servers often have very powerful CPUs, GPUs, and other dedicate hardware that allow them to perform computations much more quickly than a client device. As a result, client devices often upload datasets directly to servers in the datacenter for processing. Accordingly, the computing resources of the client devices may be underutilized or unutilized even if they are well-suited for performing some computational tasks. For example, a GPU of a client device may be able to perform some initial image processing, thereby reducing the amount of data that has to be sent to a server and minimizing the amount of bandwidth consumed by the client device when communicating with the server.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

A plurality of compute accelerators may be installed on respective computing devices, some of which may be collocated in a data center or similar hosting environment while others may be located at remote locations. For example, a number of graphics processing units (GPUs) may be installed on multiple servers that are located in a server rack in a data center and share a high-speed interconnect for high-bandwidth, low-latency communication. However, other GPUs may be installed on client devices that are in data communication with the data center via a wide area network (WAN) connection with higher latency and lower bandwidth. While the GPUs installed on the client devices may be included in or available to a virtualized GPU, the virtualized GPU may underutilize the GPUs installed on the client devices due to the bandwidth and latency constraints of the WAN connection.

Therefore, various approaches for assigning workloads or portions of workloads to compute accelerators installed on the edges of a network are described herein. These approaches take advantage of static analysis techniques to identify dependencies between operations of a workload. In the following discussion, a general description of the system and its components is provided, followed by a discussion of the operation of the same.

Figure 1:
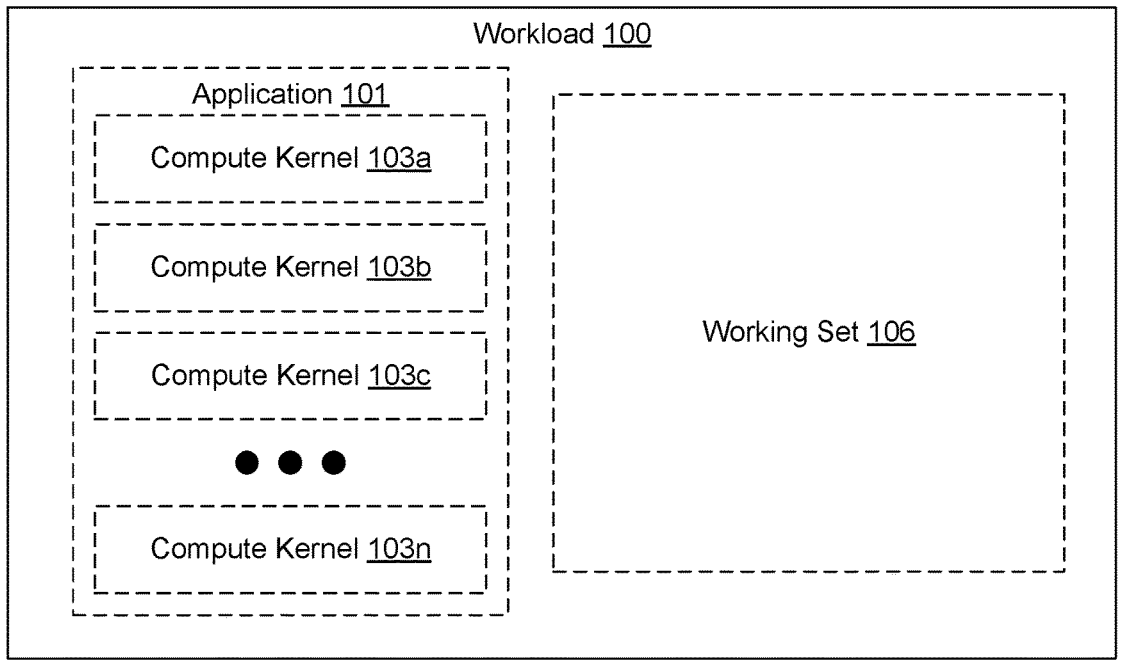
FIG. 1 is a drawing depicting an example of a workload processed by various embodiments of the present disclosure.

FIG. 1 depicts an example of a workload 100. A workload 100 is a representation of a computer-executable application 101 and/or components of an application 101, such as a computer-executable task, job, process, sub-routine, or thread. The application 101 can include one or more compute kernels 103a, 103b, 103c, . . . 103n, which can allow for portions of the application 101 to be executed in parallel or on separate computing devices. The workload 100 can also include a working set 106, which represents the data inputs processed by the application 101 generally or one or more compute kernels 103a-n specifically.

A compute kernel 103 is an executable function or subroutine of the application 101 that is compiled for execution by a virtualized compute accelerator 200 or a compute accelerator 203. Accordingly, the compute kernel 103 may be configured to operate on one or more inputs from the working set 106 and provide or contribute to one or more outputs to be stored in the working set 106. Because compute accelerators 203 are often connected to the central processing unit (CPU) by various data bus interfaces or network connections, there is often a measurable latency between when an application 101 assigns a compute kernel 103 to a compute accelerator 203 for execution and when execution actually begins. Accordingly, applications 101 are often programmed to make use of compute kernels 103 using a deferred execution model, whereby the compute kernel 103 and a portion of the working set 106 are sent to a compute accelerator 203 and the application waits to receive the results of the computation performed by the compute kernel 103.

The working set 106 represents the data being processed by the application 101. This can include various input parameters provided to the application 101, such as arguments or other data provided to the application 101 at the time that the application 101 is initiated or data retrieved by the application 101 at a later point (e.g., datasets, database tables, etc.). The working set 106 can also include the results of intermediate computation, such as the output of a function or compute kernel 103, which may be used as the input for another function of the application 101 or a compute kernel 103. The working set 106 can also include the results of any computation performed by the application 101 or its compute kernels 103.

Figure 2:
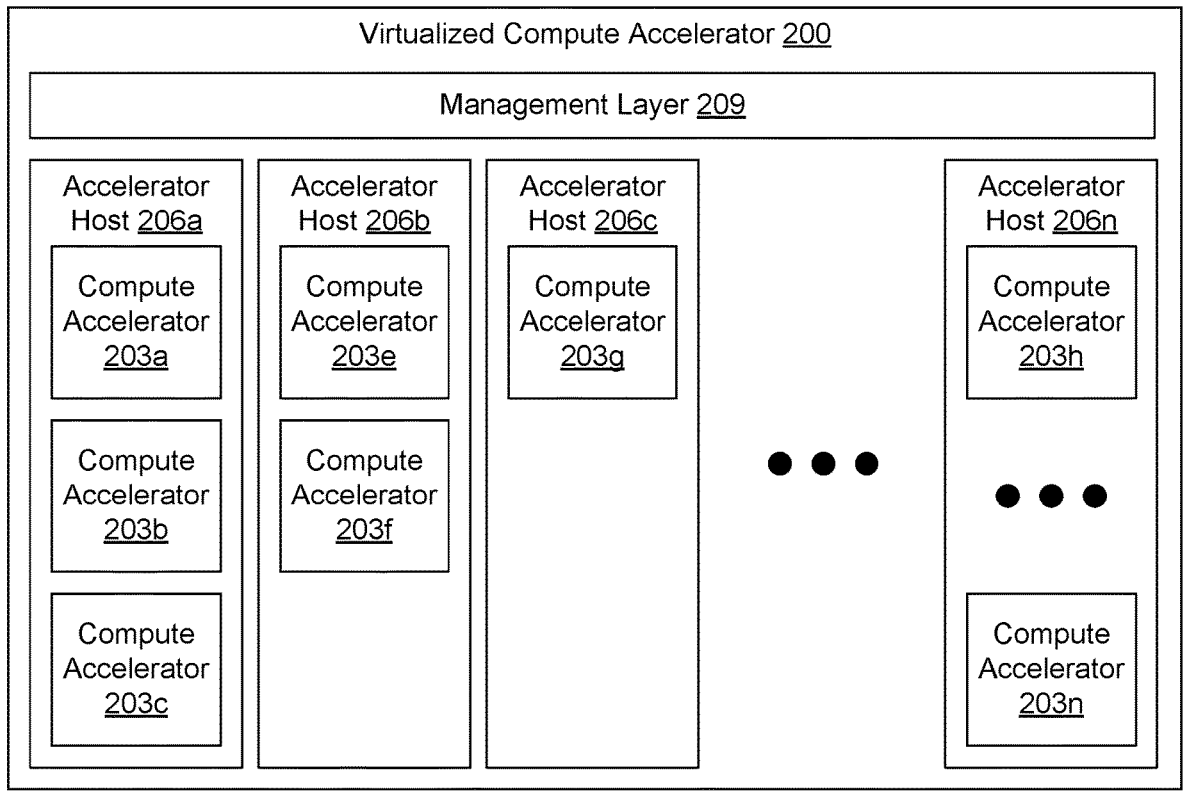
FIG. 2 is a drawing depicting a virtualized compute accelerator 200 according to various embodiments of the present disclosure.

FIG. 2 depicts an example of a virtualized compute accelerator 200. A virtualized compute accelerator 200 is a logical representation of or logical interface for a plurality of compute accelerators 203, which may be installed across a plurality of accelerator hosts 206. The virtualized compute accelerator 200 may provide an application programming interface (API) that allows the virtualized compute accelerator 200 to be presented to an individual instance of a compute accelerator 203. For example, the virtualized compute accelerator 200 could provide a device driver that could be installed on a computing device or a virtual machine (VM) to provide access to the resources of the virtualized compute accelerator 200.

The virtualized compute accelerator 200 can also include a management layer 209. The management layer 209 can include an application or service which can be executed to assign individual workloads 100 or portions of workloads 100, such as individual compute kernels 103, to one or more of the compute accelerators 203 that underlie the virtualized compute accelerator 200. For example, if an application 101 of a workload 100 assigned three compute kernels 103a, 103b, and 103c to the virtualized compute accelerator 200, the management layer 209 of the virtualized compute accelerator 200 could analyze the compute kernels 103 and assign them to individual compute accelerators 203 according to various criteria, as discussed later. For instance, the virtualized compute accelerator 200 could assign compute kernel 103a to compute accelerator 203a, compute kernel 103b to compute accelerator 203e, and compute kernel 103c to compute accelerator 203g.

A compute accelerator 203 is a peripheral device installed on a computing device, such as a host accelerator 206 that accelerates the processing of mathematical operations submitted to the compute accelerator 203 by an application executing on a central processing unit (CPU) of the computing device. Some compute accelerators 203 can be used to accelerate a wide variety of mathematical operations, allowing for their use in general purpose computing. Other compute accelerators 203 can be used to accelerate specific mathematical operations. Examples of compute accelerators 203 include graphics processing units (GPUs), field programmable gate arrays (FPGAs), digital signal processing units (DSPs), and cryptographic accelerators. However, any application specific integrated circuit (ASIC) may be able to be used a compute accelerator 203.

An accelerator host 206 is a computing device that has one or more compute accelerators 203 installed. Examples of accelerator hosts 206 include servers located in a datacenter performing computations in response to customer requests (e.g., "cloud computing"), client devices with compute accelerators 203 installed (e.g., personal computers, mobile devices, etc.). However, any computing device which has a compute accelerator 203 installed may be added to the virtualized compute accelerator 200 as an accelerator host 206.

Figure 3:
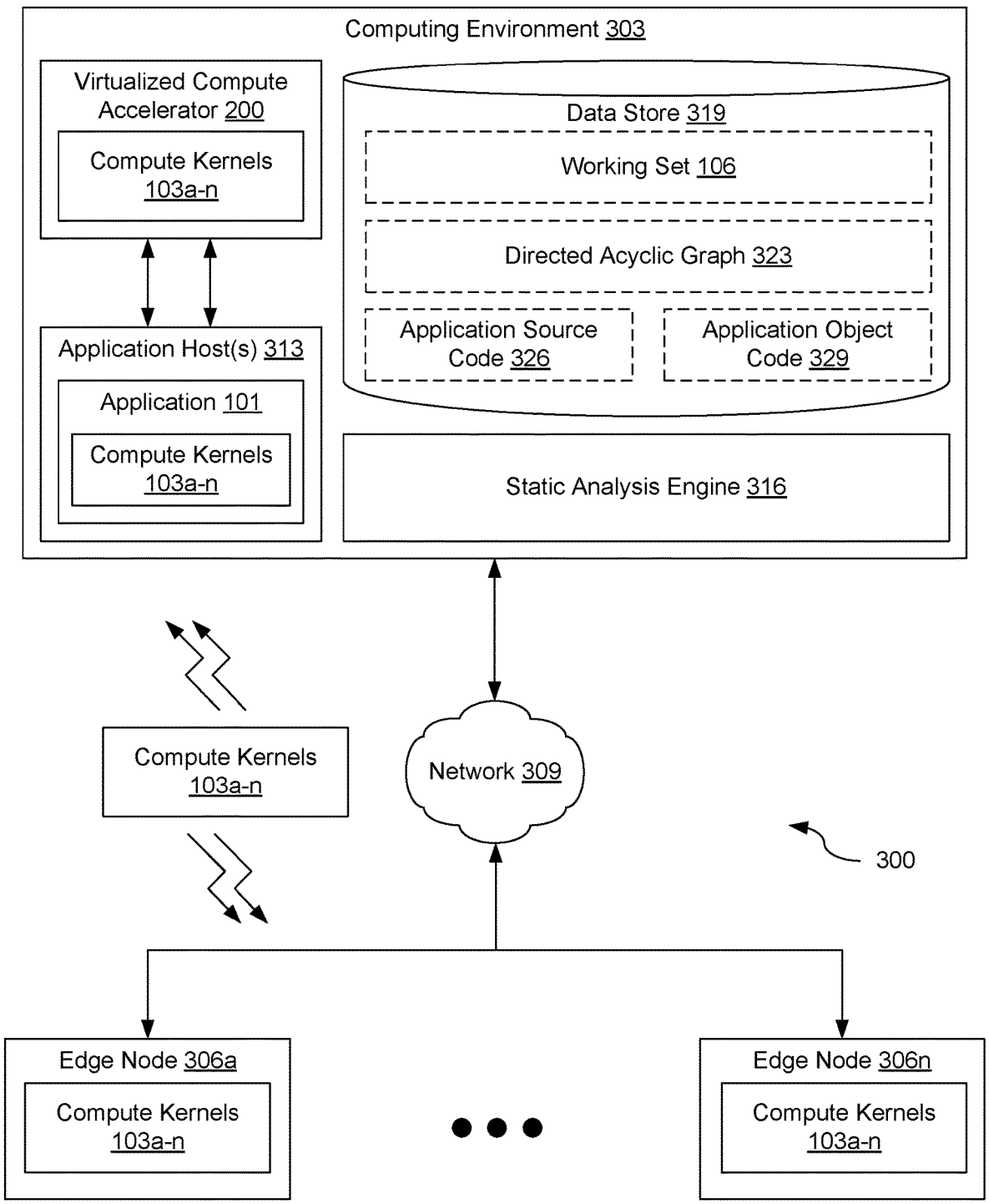
FIG. 3 is a drawing of a networked environment according to various embodiments of the present disclosure.

FIG. 3 depicts an example of a networked environment 300 according to various embodiments. The networked environment 300 includes a computing environment 303, and one or more edge nodes 306a-n, which are in data communication with the computing environment 303 via a network 309. The network 309 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 309 can also include a combination of two or more networks 309. Examples of networks 309 can include the Internet, intranets, extranets, virtual private networks (VPNs), and similar networks.

The computing environment 303 can include a server computer or any other system providing computing capability, such as an application hosts 313. Alternatively, the computing environment 303 can employ a plurality of computing devices (e.g., application hosts 313) that can be arranged, for example, in one or more server banks, computer banks, or other arrangements and be connected using high-speed interconnects. Such computing devices can be located in a single installation or can be distributed among many different geographical locations. For example, the computing environment 303 can include a plurality of computing devices that together can include a hosted computing resource, a grid computing resource, or any other distributed computing arrangement. In some cases, the computing environment 303 can correspond to an elastic computing resource where the allotted capacity of processing, network, storage, or other computing-related resources can vary over time.

Various applications or other functionality can be executed in the computing environment 303 according to various embodiments. The components executed on the computing environment 303, for example, include the virtualized compute accelerator 200, the static analysis engine 316. In some instances, the application hosts 313 themselves may be implemented as virtual machines executed by one or more computing devices in the computing environment 303.

The virtualized compute accelerator 200 is executed to provide a logical representation or logical interface for one or more application hosts 313 to interact with a plurality of compute accelerators 203. Commands sent to the virtualized compute accelerator 200 can be assigned by the virtualized compute accelerator 200 to one or more of the compute accelerators 203 that underlie the virtualized compute accelerator. The results of the commands can then be provided to the application hosts 313. Accordingly, the virtualized compute accelerator 200 may be implemented as a device drive for a virtualized or paravirtualized hardware device for one or more application hosts 101.

The static analysis engine 316 is executed to perform static analysis on the source code or object code of an application 101. Static analysis involves analyzing computer program code without executing the computer program code to identify the expected behavior of the computer program code when it is eventually executed. Examples of static analysis techniques include abstract interpretation, data-flow analysis, Hoare logic, model checking, and symbolic execution. Using static analysis techniques, the static analysis engine 316 can identify data structures, functions, subroutines, subprocesses, threads, and control logic for a program, as well as the relationships between these components. For example, the static analysis engine 316 could identify individual compute kernels 103 implemented by an application 101 as well as any execution dependencies between the compute kernels 103, such as whether execution of compute kernel 103b is dependent upon the results of the execution of compute kernel 103a.

Also, various data is stored in a data store 319 that is accessible to the computing environment 303. The data store 319 can be representative of a plurality of data stores 319, which can include relational databases, object-oriented databases, hierarchical databases, hash tables or similar key-value data stores, as well as other data storage applications or data structures. The data stored in the data store 319 is associated with the operation of the various applications or functional entities described below. This data can include the working set 106 used by an application 101 or compute kernels 103 of an application, a directed acyclic graph (DAG) 323 created by the static analysis engine 316, application source code 326, application object code 329, and potentially other data.

The working set 106 represents data being processed or to be processed by an application, which can include data being processed or to be processed by one or more compute kernels 103 of an application 101. The data represented by the working set 106 can include inputs or initial data provided to the application 101 when it begins execution (e.g., application arguments), the final results or output of the application 101 when it finishes execution, as well as intermediate data. Intermediate data can include the input or arguments to individual compute kernels 103 and the output or results of individual compute kernels 103, which may then be used as the input of additional compute kernels 103.

The directed acyclic graph 323 represents a graphical representation of the dependencies of or relationships between individual compute kernels 103 in an application 101 analyzed by the static analysis engine 316. The directed acyclic graph 323 can be analyzed by the virtualized compute accelerator 200 in order to identify which compute kernels 103 can be executed independently of other compute kernels 103 and, therefore, be assigned to separate compute accelerators 203, such as compute accelerators 203 installed on edge nodes 306. An illustration of the directed acyclic graph 323 is provided in FIG. 4. Additional discussion of the directed acyclic graph 323 accompanies the discussion of FIG. 4.

The application source code 326 represents human readable source code for the application 101. The application source code 326 may identify all data to be processed by the application 101 and the operations to be performed by the application 101. The source code for individual compute kernels 103 that will be executed by the application 101 may also be included in the application source code 326.

The application object code 329 represents the machine-readable code that allows for a processor of a computing device to execute the application 101. The application object code 329 may be distributed in binary form or compiled from the application source code 326 immediately prior to (e.g., "just-in-time" compilation) or during program execution (e.g., when the application source code 326 is parsed at run-time by an interpreter).

Next, a general description of the operation of the various components of the networked environment 300 is provided. Additional detail of the implementation of specific operations or components is provided in the accompanying discussion of the subsequent figures.

To begin, the networked environment 300 may be configured for hosting a workload 100, including the execution of an application 101 specified by the workload. Accordingly, one or more application hosts 313 may be assigned to execute the application 101 (e.g., physical servers in a data center, virtual machines in a virtualized or hosted computing environment, or combinations thereof). A virtualized compute accelerator 200 may also be instantiated and individual compute accelerators 203 installed on accelerator hosts 206 added to the virtualized compute accelerator 200.

Prior to execution of the application 101, the static analysis engine 316 can be executed to analyze the application source code 326 or application object code 329 of the application 101. Upon completion of static analysis, the static analysis engine 316 can generate a directed acyclic graph 323 representing the relationships between the compute kernels 103 of the application 101 identified using static analysis techniques. The directed, acyclic graph 323 can then be stored in the data store 319 for use by the virtualized compute accelerator 200, such as when the management layer 209 of the virtualized compute accelerator 200 is determining which compute accelerator(s) 203 to assign individual compute kernels 103 to for execution.

As the application 101 is executed by the application host(s) 313, one or more compute kernels 103a-n may be spawned or instantiated for execution. The application 101 may send the compute kernels 103a-n to the virtualized compute accelerator 200 for execution. Upon completion of execution of the compute kernels 103a-n, the virtualized compute accelerator 200 can provide the results to the application 101, which may include the result data itself or references to the result data stored in the working set 106.

Upon receipt of individual compute kernels 103a-n, the management layer 209 can determine which compute accelerator(s) 203 to assign the individual compute kernels 103 for execution. The determination can be based on a variety of factors, including whether execution of a compute kernel 103 is dependent on execution of another compute kernel 103 (as indicated by the directed, acyclic graph 323) the nature of the computation performed by the compute kernel 103, the performance capabilities or location of individual compute accelerators 203, and potentially other factors. For example, where one compute kernel 103 depends on the results of another compute kernel 103 (e.g., where the results of computation by a compute kernel 103 are used as the arguments or input for another compute kernel 103), then both compute kernels 103 may be assigned to the same compute accelerator 203 to take advantage of the locality of resources and minimize latency related to transferring the results of the first compute kernel 103 from the first compute accelerator 203 to the second compute kernel 103 on a second compute accelerator 203. However, if two compute kernels 103 have no dependencies or relationships, they may be assigned by the management layer 209 to execute on separate compute accelerators 203 to be executed in parallel.

As another example, the type of work being performed by a compute kernel 103 may influence the decision of the management layer 209 of the virtual compute accelerator for which compute accelerator 203 to assign the compute kernel 103. For example, if the static analysis engine 316 has determined that the compute kernel 103 is likely to use a large amount of memory, the management layer 209 may assign to compute kernel 103 to a compute accelerator 203 that has a sufficient amount of memory to execute that compute kernel 103. As another example, if the static analysis engine 316 determines that a compute kernel 103 is processing data generated by the accelerator host 206, the management layer 209 may assign the compute kernel 103 to that accelerator host 206. For example, if a compute kernel 103a is performing image processing operations on images or videos captured by a camera of an edge node 306a (e.g., a smartphone, tablet, or other mobile device), the management layer 209 may assign the compute kernel 103a to the compute accelerator 203a (e.g., graphics processing unit) installed on the edge node 306a in order to minimize the amount of bandwidth consumed by transmitting unprocessed images or video across the network 309.

Figure 4:
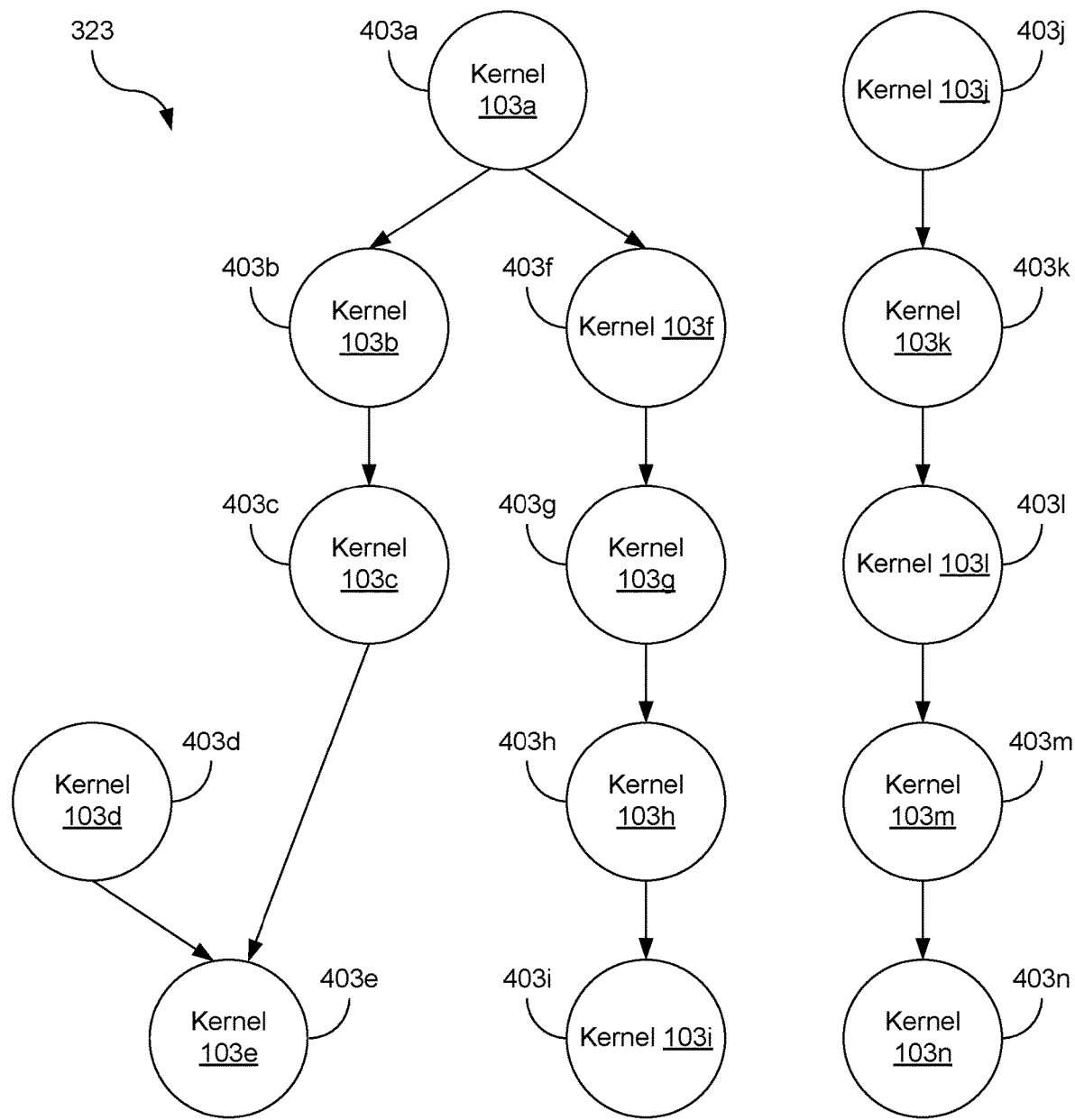
FIG. 4 is a drawing of an example of a directed acyclic graph utilized by various embodiments of the present disclosure.

Referring next to FIG. 4, shown is an example of a directed acyclic graph 323 generated by the static analysis engine. The directed acyclic graph 323 includes a number of nodes 403a-n. Each node 403 represents a respective compute kernel 103a-n that will be executed by the application 101 of the workload 100. Edges between nodes 403a-n indicate computational dependencies between individual compute kernels 103a-n. For example, node 403a is depicted in FIG. 4 as a parent node of nodes 403b and 403f, indicating that the execution of compute kernels 103b and 103f depend upon the results of compute kernel 103a. This could reflect any number of dependencies, such as the output of compute kernel 103a being used as an input for compute kernels 103b and 103f. However, nodes 403j-n are depicted as being unconnected to any of notes 403a-i, indicating that execution of compute kernels 103j-n is independent of the execution of any of compute kernels 103a-i.

Figure 5:
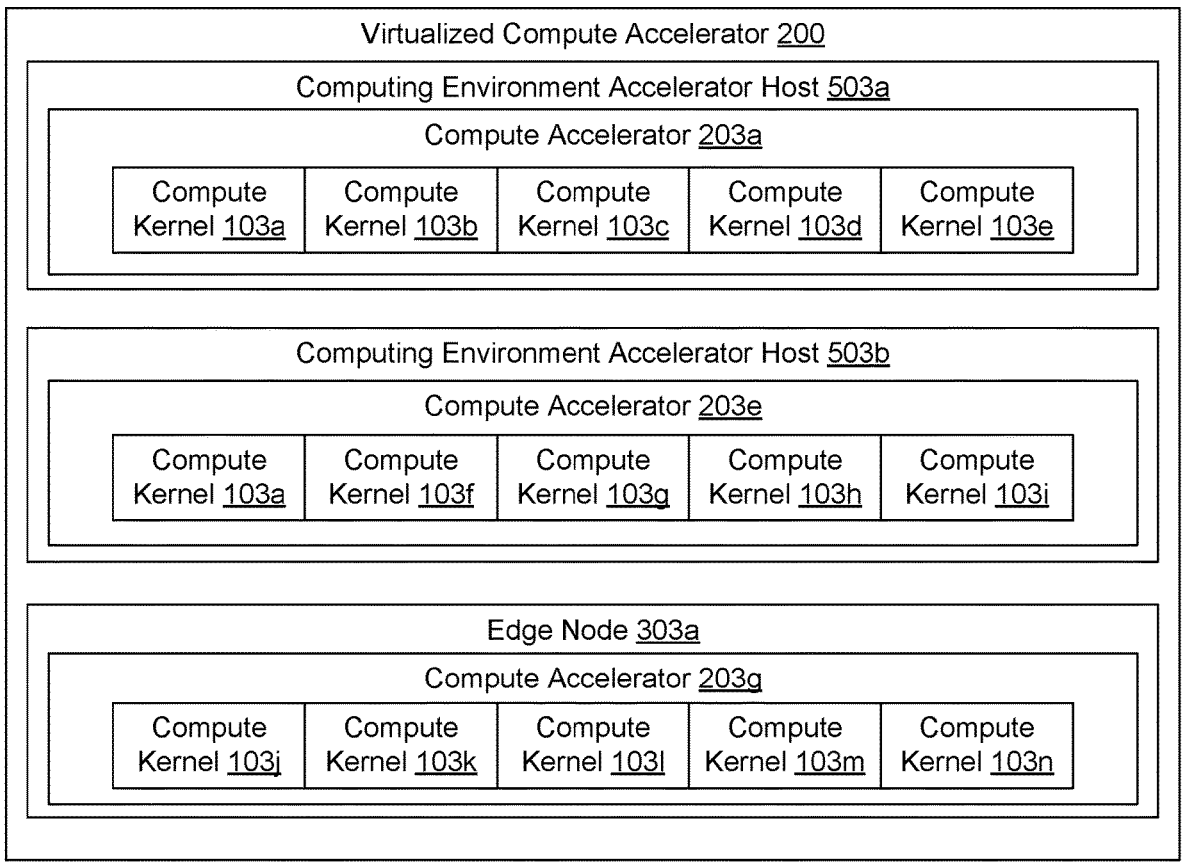
FIG. 5 is a drawing depicting the assignment of compute kernels to compute accelerators based on the directed acyclic graph depicted in FIG. 4.

Turning now to FIG. 5, shown is a representation of the assignment of individual compute kernels 103a-n by the virtual compute accelerator 200 to individual compute accelerators 203. An analysis of the directed acyclic graph 323 depicted the example of FIG. 4 shows that compute kernel 103a is a root node for compute kernels 103b, 103c, and 103e-i. Compute kernel 103d is also a root node for compute kernel 103e. Compute kernel 103j is a root node for compute kernels 103k-n, which share no connections with any of compute kernels 103a-i. Accordingly, while compute kernels 103j-n must be executed sequentially, as indicated by the directed acyclic graph of FIG. 4, they can be executed in parallel to compute kernels 103a-i. Similarly, compute kernels 103a and 103f-i could be executed in parallel to compute kernels 103a-e, and compute kernel 103d could be executed in parallel with compute kernels 103a-c and 103f-n.

The management layer 209 of the virtual compute accelerator 200 could therefore assign the compute kernels 103a-n to compute accelerators 203 installed on compute accelerator hosts 206 to maximize opportunities for parallel execution of the compute kernels 103 while taking advantage of locality and factoring in the nature of the computation being performed by the individual compute kernels 103.

For example, the compute kernels 103a-e might be placed on a first compute accelerator 203a installed on a first accelerator host 206a located in the computing environment 303, denoted as computing environment accelerator host 503a in FIG. 5. Although compute kernel 103d could be executed on a separate compute accelerator 203 in parallel with compute kernels 103a-c, the management layer 109 might still assign compute kernel to compute accelerator 203a for execution with compute kernels 103a-c and 103e due to the dependency of compute kernel 103e on compute kernel 103d. By executing compute kernels 103c and 103d on the same compute accelerator 203a, compute kernel 103e could take advantage of the fact that the results of compute kernels 103c and 103d are likely to still reside in the memory of compute accelerator 203a when compute kernel 103e begins execution, thereby minimizing any delay in compute kernel 103e's execution due to the latency related to accessing data stored in other locations. Meanwhile, compute kernels 103a and 103f-i could be executed in parallel on compute accelerator 203e installed on a second computing environment accelerator host 503b. Although execution of compute kernel 103a is duplicated in this example, allowing compute kernel 103a to execute simultaneously on two separate compute accelerators 203 allows for the workflows to proceed in parallel without either workflow waiting to receive the results of compute kernel 103a from the other compute accelerator 203.

As compute kernels 103j-n have no dependencies with compute kernels 103a-i, they can be assigned to execute on a third compute accelerator 203g. For illustrative purposes, FIG. 5 depicts that the compute kernels 103j-n have been assigned to execute on an edge node 306a. This illustrative example reflects that compute kernels 103 can be assigned by management layer 209 of the virtual compute accelerator 200 to execute on edge nodes 306 when appropriate in view of various resource constraints. For example, it may be more optimal to push portions of a workload closer to where the data is being generated, such as pushing portions of an image processing workload to a mobile device that is capturing the images.

Figure 6:
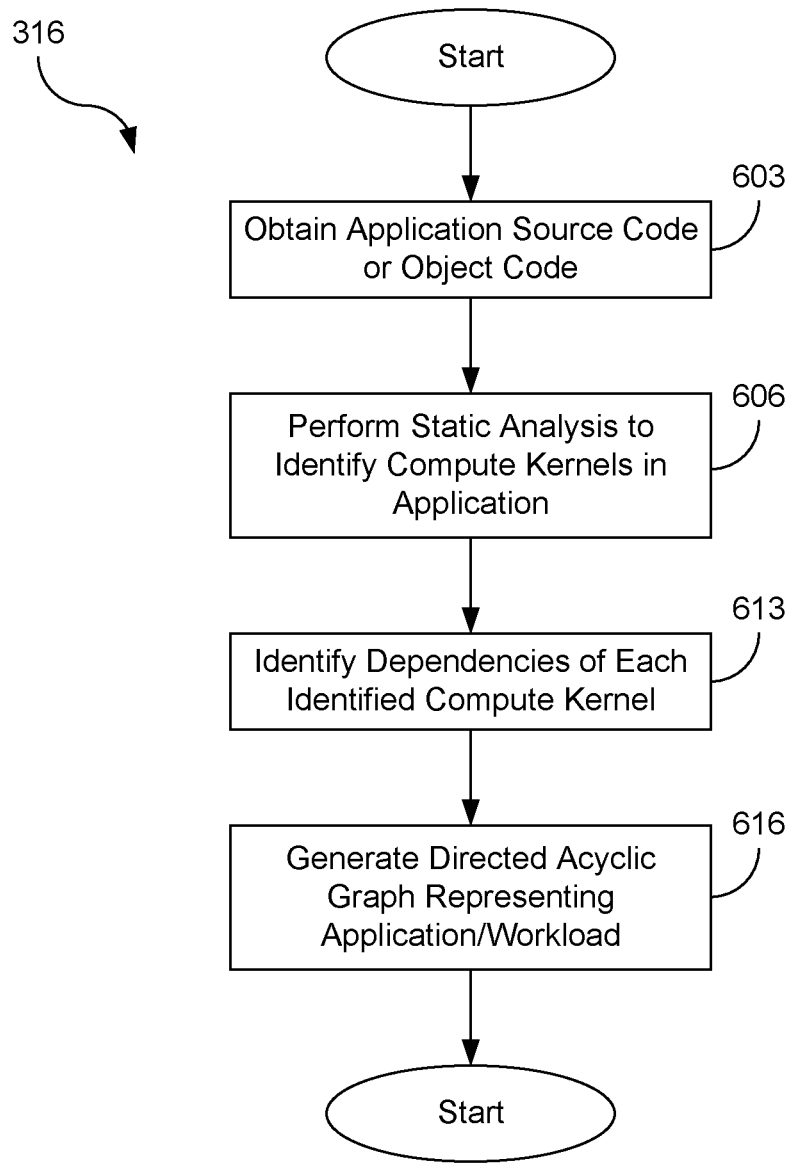
FIG. 6 is a flowchart illustrating one example of functionality implemented as portions of an application executed in a computing environment in the networked environment of FIG. 3 according to various embodiments of the present disclosure.

Referring next to FIG. 6, shown is a flowchart that provides one example of the operation of a portion of the static analysis engine 316. It is understood that the flowchart of FIG. 3 provides merely an example of the many different types of functional arrangements that can be employed to implement the static analysis engine 316. As an alternative, the flowchart of FIG. 3 can be viewed as depicting an example of elements of a method implemented in the computing environment 303.

Beginning at step 603, the static analysis engine 316 obtains the application source code 326 or the application object code 329 for an application 101. Whether the static analysis engine 316 obtains or retrieves the application source code 326 or the application object code 329 can depend on variety of factors. For example, the static analysis engine 316 may have received an argument or instruction to retrieve the application source code 326 or the application object code 329. This may be done, for example, if a static analysis technique that is particularly suited for one representation of the application 101 or the other is to be employed. In some instances, the application source code 326 may be unavailable, such that the only option for the static analysis engine 316 is to perform static analysis on the application object code 329. In some implementations, the static analysis engine 316 may retrieve both the application source code 326 and the application object code 329 if both are available.

Then, at step 606, the static analysis engine 316 can perform static analysis of the application source code 326 or application object code 329 retrieved at step 603. Various static analysis techniques can be used to identify the individual functional components of the application 101, such as compute kernels 103, and the flow of the application 101 from one component to the next. Examples of static analysis techniques that may be employed include abstract interpretation, data-flow analysis, Hoare logic, model checking, and/or symbolic execution.

Moving on to step 613, the static analysis engine 316 can analyze the results of the static analysis operation performed at step 606 to identify relationships or dependencies between individual components of the application 101, such as compute kernels 103. For example, for each identified compute kernel 103, the static analysis engine 316 may identify each resource (e.g., data structure, memory address, etc.) used as an input for the compute kernel 103 and each resource that represents an output of the compute kernel 103. The static analysis engine 316 can then determine whether any of the input resources for a particular compute kernel 103 are also the output resources of another compute kernel 103. Likewise, the static analysis engine 316 can also determine whether any of the output resources of a particular compute kernel 103 are used as input resources for another compute kernel 103. Where the output of one compute kernel 103 is used as the input for another compute kernel 103, a reference to the relationship may be created and stored by the static analysis engine 316.

Finally, at step 616, the static analysis engine 316 generates the directed, acyclic graph 323 representing the compute kernels 103 of the application 101. For each compute kernel 103 previously identified in step 606, a respective node 403 is created in the directed, acyclic graph 323. In each instance where two compute kernels 103 share a resource that would create a dependency between the two compute kernels 103 (e.g., where the output of one compute kernel 103 is used as the input for another compute kernel 103), an edge is created in the directed acyclic graph 323 representing the relationship. For example, the direction of the edge may follow the flow of data between compute kernels 103 (e.g., output from one compute kernel 103 being used as an input for another compute kernel 103). After the graph is generated, the process subsequently ends.

In some embodiments, additional information about each compute kernel 103 may be stored in the respective node 403 of the directed, acyclic graph 323. For example, static analysis techniques can predict performance requirements of individual compute kernels 103 when they are to be executed. As a simple, illustrative example, if static analysis reveals that a compute kernel 103 will allocate a matrix comprising 10,000,000 32-bit integers, then the static analysis engine 316 may determine that that the compute kernel 103 will require approximately 40 megabytes to perform that operation. Similarly, static analysis techniques can identify the type of computation being performed by the compute kernel 103. For example, the static analysis engine 316 may identify the types of data structures or resources being manipulated and the operations being performed on the identified data structure or resources. This can allow the static analysis engine 316 to infer the type of computation being performed by the compute kernel 103 (e.g., image processing, digital signal processing, cryptographic operations, machine-learning, etc.). This information can be stored in the node 403 representing the compute kernel 103.

Figure 7:
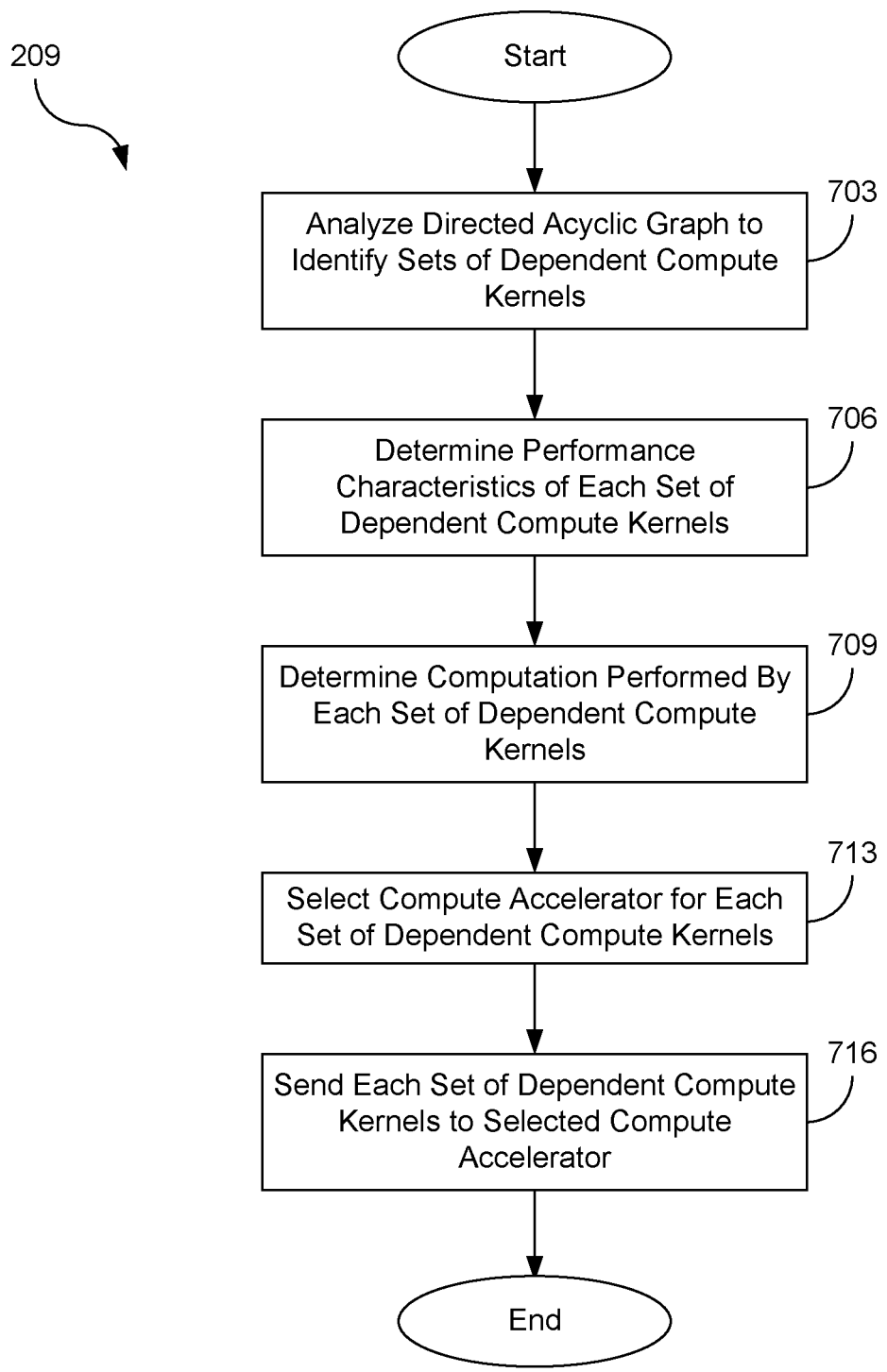
FIG. 7 is a flowchart illustrating one example of functionality implemented as portions of an application executed in a computing environment in the networked environment of FIG. 3 according to various embodiments of the present disclosure.

Referring next to FIG. 7, shown is a flowchart that provides one example of the operation of a portion of the management layer 209 of a virtualized compute accelerator 200. It is understood that the flowchart of FIG. 7 provides merely an example of the many different types of functional arrangements that can be employed to implement the operation of the management layer 209. As an alternative, the flowchart of FIG. 7 can be viewed as depicting an example of elements of a method implemented by the virtualized compute accelerator 200.

Beginning with step 703, the management layer 209 can analyze a directed acyclic graph 323 to identify sets of dependent compute kernels 103. For example, starting at the root node 403 of the directed acyclic graph 323, the management layer 209 could perform a depth first search of the directed, acyclic graph 323. In this example, each branch of the directed acyclic graph identified by the depth first search would represent a set of compute kernels 103 with dependent execution states (e.g., an output of a first compute kernel 103 is used as an input for a second compute kernel 103).

Then at step 706, the management layer 209 can then determine the performance characteristics each set of dependent compute kernels 103 identified previously at step 703. For example, the management layer 209 may reference each respective node 403 of each compute kernel 103 to determine the performance characteristics of each compute kernel 103. This can allow the management layer 209 to determine the total amount of memory that will be used by each set of dependent compute kernels 103, the expected amount of processing power that will be consumed by a set of dependent compute kernels 103, or other performance profiles.

Next at step 709, the management layer 209 can then determine the type of computation or task being performed by each set of dependent compute kernels 103 identified previously at step 703. For example, the management layer 209 may reference each respective node 403 of each compute kernel to retrieve information regarding the determination of the static analysis engine 316 regarding the type of task or computation being performed by individual compute kernels 103.

Then at step 713, the management layer 209 selects a respective compute accelerator 203 for each set of dependent compute kernels 103. The compute accelerator 203 selected for a set of dependent compute kernels 103 may be selected based at least in part on one or more factors. For example, the compute accelerator 203 may be selected based on the amount of computing resources predicted to be consumed by one or more of the compute kernels 103 in the dependent set of compute kernels 103. For instance, one or more of the compute kernels 103 in a set of dependent compute kernels 103 may be assigned to a compute accelerator 203 that has sufficient available memory to match the requirements of the compute kernels 103. As another example, the compute accelerator 203 may be selected based on the type of computation being performed by the compute kernels 103 or the type of data being processed by one or more of the compute kernels 103. For example, if the static analysis engine 316 has determined that several of the compute kernels 103 in a set of dependent compute kernels 103 are processing or manipulating data generated by an edge node 306, the management layer 209 may assign these compute kernels 103 to a compute accelerator 203 installed on the edge node 306 where the data is located.

Proceeding to step 716, the management layer 209 can then send each set of dependent compute kernels 103, or portions of the set of dependent compute kernels 103, to the selected compute accelerator 203. The management layer 209 may also provide copies of the working set 106 or portions of the working set 106 to the selected compute accelerator 203. Alternatively, the compute kernels 103 may use various protocols to work on a shared or single copy of the working set 106 or data contained in the working set 106. For example, the management layer 209 may use remote direct memory access (RDMA) or other network protocols to transfer the compute kernels 103 to the selected compute accelerator 203 and the relevant portions of the working set 106 used by the compute kernels 103. As another example, the RDMA protocol may allow for compute kernels 103 executed on a variety of compute accelerators 103 to access a copy of the working set 106 stored in single location. RDMA may be used in situations where high-speed data interconnects are available between individual accelerator hosts 206 (e.g., between accelerator hosts 206 in a compute environment 303), while other protocols (e.g., TCP/IP) may be used in situations where bandwidth is more constrained or latency is expected to be relatively high (e.g., transferring compute kernels 103 to edge nodes 306 connected via a WAN).

In some implementations, the management layer 209 may also cause the compute kernels 103 and portions of the working set 106 to be encrypted prior to transmission to an assigned compute accelerator 203. Encryption may be performed in order to prevent malicious parties from reading or manipulating the data being processed or altering the program code of the individual compute kernels 103. In these implementations, the compute accelerator 203 may decrypt the compute kernels 103 and/or working set 106 upon receipt using a pre-shared key or a respective private-key of an asymmetric key-pair.

In other implementations, however, the management layer 209 may additionally or alternatively add a hash to the compute kernels 103 sent to the individual compute accelerators. The addition of the hash can allow the compute accelerators 203 and the management layer 209 to detect and/or confirm whether or not a compute kernel 103 or working set has been modified by comparing the hash accompanying the compute kernels 103 or working set 106 with a copy of the hash stored in a hash database, such as a blockchain, distributed hash table, or other public distributed ledger.

Although the virtualized compute accelerator 200, management layer 209, and static analysis engine 316 described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Although the flowcharts of FIGS. 6 and 7 show a specific order of execution, it is understood that the order of execution can differ from that which is depicted. For example, the order of execution of two or more blocks can be scrambled relative to the order shown. Also, two or more blocks shown in succession in FIGS. 6 and 7 can be executed concurrently or with partial concurrence. Further, in some embodiments, one or more of the blocks shown in FIGS. 6 and 7 can be skipped or omitted. In addition, any number of counters, state variables, semaphores, or warning messages might be added to the logical flow described herein, for purposes of enhanced utility, accounting, performance measurement, or providing troubleshooting aids, etc. It is understood that all such variations are within the scope of the present disclosure.

Also, any logic or application described herein, including the virtualized compute accelerator 200, management layer 209, and static analysis engine 316, that includes software or code can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including the virtualized compute accelerator 200, management layer 209, and static analysis engine 316, can be implemented and structured in a variety of ways. For example, one or more applications described can be implemented as modules or components of a single application. Further, one or more applications described herein can be executed in shared or separate computing devices or a combination thereof.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
   generate a directed acyclic graph (DAG) representing a workload assigned to a virtualized compute accelerator that is executed by the processor of the computing device, wherein:
   the workload comprises a plurality of compute kernels and the DAG comprising a plurality of nodes and a plurality of edges,
   each of the nodes represents a respective compute kernel,
   each of the edges represents a dependency between a respective pair of the compute kernels, and
   the virtualized compute accelerator represents a logical interface for a plurality of compute accelerators;
   analyze, by a management layer of the virtualized compute accelerator, the DAG to identify sets of dependent compute kernels, a respective set of dependent compute kernels being independent of other sets of dependent compute kernels and execution of at least one compute kernel in the respective set of dependent compute kernels depending on a previous execution of another compute kernel in the respective set of dependent compute kernels;
   determine, by the management layer, a set-specific computing resource profile for a particular set of dependent compute kernels by an analysis of resource requirements specified by a set of nodes corresponding to the particular set of dependent compute kernels, the set-specific computing resource profile comprising a total memory and a total processing power determined for the particular set of dependent compute kernels as a whole;

identify, by a static analysis engine executed by the processor of the computing device, a host device that captures image data used for an image processing operation of at least one compute kernel of the particular set of dependent compute kernels;

assign, by the management layer, the particular set of dependent compute kernels to a particular compute accelerator of the plurality of compute accelerators that is identified to be installed to the host device that captures the image data, and is identified to include sufficient available resources based at least in part on the total memory and the total processing power for the particular set of dependent compute kernels for execution; and execute the particular set of dependent compute kernels using the particular compute accelerator.

2. The system of claim 1, wherein the machine-readable instructions that cause the computing device to generate the DAG representing the workload further cause the computing device to at least:

perform static analysis on an object code or a source code representation of the workload to identify the plurality of compute kernels; and perform static analysis on the object code or the source code representation of the workload to identify dependencies between pairs of the plurality of compute kernels.

3. The system of claim 1, wherein the machine-readable instructions that cause the computing device to assign the respective set of dependent compute kernels to a respective one of the compute accelerators further cause the computing device to at least:

determine that the respective one of the compute accelerators complies with a predefined criterion;

select the respective one of the compute accelerators from the plurality of compute accelerators based on a determination that the respective one of the compute accelerators complies with the predefined criterion; and send the respective set of dependent compute kernels to the respective one of the compute accelerators.

4. The system of claim 3, wherein the machine-readable instructions further cause the computing device to encrypt the respective set of dependent compute kernels sent to the respective one of the compute accelerators.

5. The system of claim 3, wherein the predefined criterion comprises the respective one of the compute accelerators being configured to use a remote direct memory access (RDMA) protocol to access a single copy of a working set.

6. The system of claim 1, wherein the machine-readable instructions that cause the computing device to assign the respective set of dependent compute kernels to a respective one of the compute accelerators further cause the computing device to at least:

determine that a set of the dependent compute kernels is performing a predefined computation;

select the respective one of the compute accelerators from the plurality of compute accelerators based on a determination that the set of the dependent compute kernels is performing the predefined computation; and send the set of the dependent compute kernels to the respective one of the compute accelerators.

7. The system of claim 6, wherein the predefined computation involves a modification to a predefined resource.

8. A method, comprising:

generating, by a computing device, a directed acyclic graph (DAG) representing a workload assigned to a virtualized compute accelerator that is executed by a processor of the computing device, wherein:

the workload comprises a plurality of compute kernels and the DAG comprising a plurality of nodes and a plurality of edges, each of the nodes represents a respective compute kernel, each of the edges represents a dependency between a respective pair of the compute kernels, and the virtualized compute accelerator represents a logical interface for a plurality of compute accelerators;

analyzing, by a management layer of the virtualized compute accelerator, the DAG to identify sets of dependent compute kernels, a respective set of dependent compute kernels being independent of other sets of dependent compute kernels and execution of at least one compute kernel in the respective set of dependent compute kernels depending on a previous execution of another compute kernel in the respective set of dependent compute kernels;

determining, by the management layer, a set-specific computing resource profile for a particular set of dependent compute kernels by an analysis of resource requirements specified by a set of nodes corresponding to the particular set of dependent compute kernels, the set-specific computing resource profile comprising a total memory and a total processing power determined for the particular set of dependent compute kernels as a whole;

identifying, by a static analysis engine executed by the processor of the computing device, a host device that originates image data used for an image processing operation of at least one compute kernel of the particular set of dependent compute kernels;

assigning, by the management layer, the particular set of dependent compute kernels to a particular compute accelerator of the plurality of compute accelerators that is identified to be installed to the host device that originates the image data used for the image processing operation, and is identified to include available resources based at least in part on the total memory and the total processing power for the particular set of dependent compute kernels for execution; and executing the particular set of dependent compute kernels using the particular compute accelerator.

9. The method of claim 8, wherein generating the DAG representing the workload further comprises:

performing static analysis on an object code or a source code representation of the workload to identify the plurality of compute kernels; and performing static analysis on the object code or the source code representation of the workload to identify dependencies between pairs of the plurality of compute kernels.

10. The method of claim 8, wherein assigning the respective set of dependent compute kernels to a respective one of the compute accelerators further comprises:

determining that the respective one of the compute accelerators complies with a predefined criterion;

selecting the respective one of the compute accelerators from the plurality of compute accelerators based on a determination that the respective one of the compute accelerators complies with the predefined criterion; and sending the respective set of dependent compute kernels to the respective one of the compute accelerators.

11. The method of claim 10, further comprising encrypting the respective set of dependent compute kernels sent to the respective one of the compute accelerators.

12. The method of claim 8, wherein assigning the respective set of dependent compute kernels to a respective one of the compute accelerators further comprises:
   determine that a set of the dependent compute kernels is performing a predefined computation;
   select the respective one of the compute accelerators from the plurality of compute accelerators based on a determination that the set of the dependent compute kernels is performing the predefined computation; and
   send the set of the dependent compute kernels to the respective one of the compute accelerators.

13. The method of claim 12, wherein the predefined computation involves a modification to a predefined resource.

14. The method of claim 8, wherein a respective one of the compute accelerators uses a remote direct memory access (RDMA) protocol to access a single copy of a working set.

15. A non-transitory, computer-readable medium comprising machine-readable instruction that, when executed by a processor, cause a computing device to at least:
   generate a directed acyclic graph (DAG) representing a workload assigned to a virtualized compute accelerator that is executed by the processor of the computing device, wherein:
      the workload comprises a plurality of compute kernels and the DAG comprising a plurality of nodes and a plurality of edges,
      each of the nodes represents a respective compute kernel,
      each of the edges represents a dependency between a respective pair of the compute kernels, and
      the virtualized compute accelerator represents a logical interface for a plurality of compute accelerators;
   analyze, by a management layer of the virtualized compute accelerator, the DAG to identify sets of dependent compute kernels, a respective set of dependent compute kernels being independent of other sets of dependent compute kernels and execution of at least one compute kernel in the respective set of dependent compute kernels depending on a previous execution of another compute kernel in the respective set of dependent compute kernels;
   determine, by the management layer, a set-specific computing resource profile for a particular set of dependent compute kernels by an analysis of resource requirements specified by a set of nodes corresponding to the particular set of dependent compute kernels, the set-specific computing resource profile comprising a total memory and a total processing power determined for the particular set of dependent compute kernels as a whole;
   identify, by a static analysis engine executed by the processor of the computing device, a host device that captures image data used for an image processing operation of at least one compute kernel of the particular set of dependent compute kernels;
   assign, by the management layer, the particular set of dependent compute kernels to a particular compute accelerator of the plurality of compute accelerators that is identified to be installed to the host device that captures the image data, and is identified to include available resources based at least in part on the total memory and the total processing power for the particular set of dependent compute kernels for execution; and
   execute the particular set of dependent compute kernels using the particular compute accelerator.

16. The non-transitory, computer-readable medium of claim 15, wherein the machine-readable instructions that cause the computing device to generate the DAG representing the workload further cause the computing device to at least:
   perform static analysis on an object code or a source code representation of the workload to identify the plurality of compute kernels; and
   perform static analysis on the object code or the source code representation of the workload to identify dependencies between pairs of the plurality of compute kernels.

17. The non-transitory, computer-readable medium of claim 15, wherein the machine-readable instructions that cause the computing device to assign the respective set of dependent compute kernels to a respective one of the compute accelerators further cause the computing device to at least:
   determine that the respective one of the compute accelerators complies with a predefined criterion;
   select the respective one of the compute accelerators from the plurality of compute accelerators based on a determination that the respective one of the compute accelerators complies with the predefined criterion; and
   send the respective set of dependent compute kernels to the respective one of the compute accelerators.

18. The non-transitory, computer-readable medium of claim 17, wherein the machine-readable instructions further cause the computing device to encrypt the respective set of dependent compute kernels sent to the respective one of the compute accelerators.

19. The non-transitory, computer-readable medium of claim 15, wherein the machine-readable instructions that cause the computing device to assign the respective set of dependent compute kernels to a respective one of the compute accelerators further cause the computing device to at least:
   determine that a set of the dependent compute kernels is performing a predefined computation;
   select the respective one of the compute accelerators from the plurality of compute accelerators based on a determination that the set of the dependent compute kernels is performing the predefined computation; and
   send the set of the dependent compute kernels to the respective one of the compute accelerators.

20. The non-transitory, computer-readable medium of claim 15, wherein a respective one of the compute accelerators uses a remote direct memory access (RDMA) protocol to access a single copy of a working set.

* * * * *